July 27, 1965 D. E. WILBUR, JR 3,197,531
METHOD FOR EVEN DISTRIBUTION OF LIQUID-STATE FOAM
Filed May 28, 1963

INVENTOR.
DONALD E. WILBUR, JR.
BY
ATTORNEY 3,197,531
METHOD FOR EVEN DISTRIBUTION OF
LIQUID-STATE FOAM
Donald E. Wilbur, Jr., Hastings on Hudson, N.Y., assignor to Union Carbide Corporation, a corporation of New York
Filed May 28, 1963, Ser. No. 283,891
3 Claims. (Cl. 264—88)

This invention relates to the uniform distribution of highly viscous fluid such as liquid-state foam and the like. More specifically, this invention refers to a method for making foamed panels having an even and uniform thickness.

One of the serious problems in handling foamable compositions such as polyurethane is attaining a uniform distribution of the foam over a large surface area. In order to achieve good results the foam must be spread quickly while in the liquid phase and preferably prior to the commencement of the foaming action. A number of methods and apparatus have been developed to solve this problem but they require the use of costly and complicated mechanical equipment and are not very successful in forming a smooth uniform surface of equal thickness. These prior techniques inherently set up numerous shear planes in the foam since the foam is not spread as an integral laydown. Such shear planes in the foam laydown are caused as one portion of the foam abuts another foaming portion subsequent to the commencement of the foaming action. Any succeeding failure of the foam when under stress will invariably occur at one of these shear planes.

Accordingly, it is the principal object of the invention to provide a novel process for distributing liquid-state foam uniformly over a desired area.

It is another object to provide a process suitable for intermittently or continuously forming a panel having a uniform and even foamed core.

Yet another object is to provide a process for spreading and distributing liquid-state foam evenly over a suitable base without having elements to which the foam would adhere to upon contact and without generating shear planes in the foam.

The objects of the invention are achieved by impinging a high pressure stream of gas on the liquid-state foam such that a uniform laydown of constant thickness is attained prior to the commencement of the foaming action.

The invention will become clear and apparent from the following description taken in conjunction with the accompanying drawing, in which.

Figure 1:
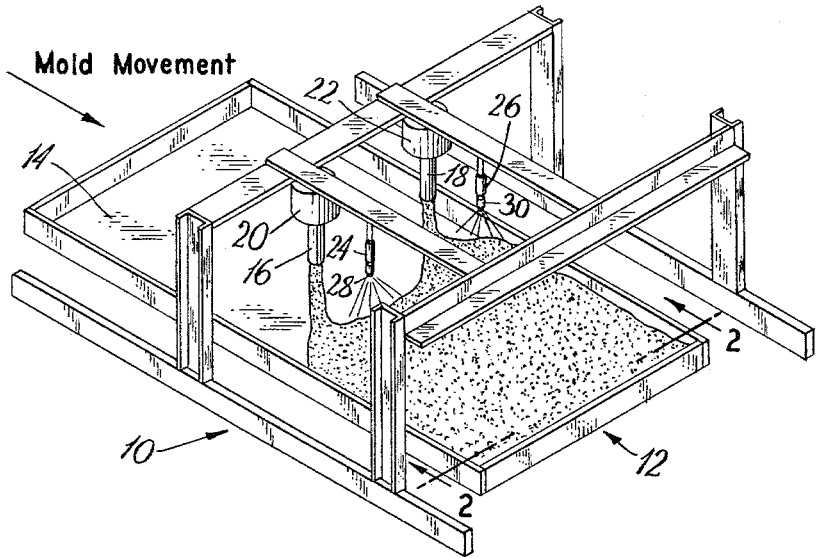
Figure 1 is a diagrammatic view in perspective showing the apparatus of the invention in operation.

Referring now to the drawing, and particularly to Figure 1, there is shown an apparatus 10 used to practice the invention. As shown there, a rectangular mold pattern or framelike supporting structure 12 having a bottom 14 is disposed on a platform (not shown) which is capable of movement in one plane, as represented by the arrow. The bottom 14 may be any suitable skin desired for a particular foam panel. Disposed above the framelike structure 12 is a pair of dispensing orifices 16 and 18 which are connected to, and are supplied with liquid-state foam such as urethane or the like, from a pair of mixing heads 20 and 22. Of course, any number of dispensing orifices and mixing heads may be used depending upon the width and surface contour of the foam panel desired. Adjacent to the foam dispensing orifices 16 and 18 are a pair of gas jets 24 and 26. The gas jets 24 and 26 are suitably provided with nozzles 28 and 30 which direct the gas streams at the foam. Preferably fan shaped nozzles or the like are used in the practice of the invention since they aid in the uniform distribution of the foam. Of course, a plurality of gas jets may also be used if desired.

Figure 2:
Figure 2 is a cross-sectional view taken along the line 2—2 of Figure 1, showing the mold after the liquid-state foam has been deposited and subsequently spread uniformly and to an even thickness by the impinging gas stream.
Figure 3:
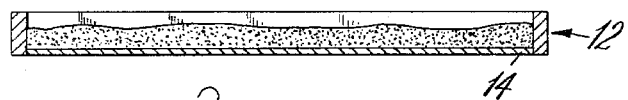
Figure 3 is a cross-sectional view in elevation of the partially foamed deposited layer of Figure 2.

In operation, each of the orifices 16 and 18 dispenses a stream of foam into the framelike structure 12. As the foam is deposited in the structure 12, the gas nozzles which are disposed adjacent to the orifices 16 and 18 direct the gas streams at the dispensed foam thus causing the foam to be spread out immediately and brought into integral contact with all adjacent foam streams. The gas streams form a continuous, integral layer of foam having no shear planes within the structure 12. The foam being subjected to the gas pressure forms a slight ripple or small wave between the dispensing orifices and the gas nozzles. This slight wave is caused by the action of the air streams on the foam and by the relative movement of the mold or framelike structure. As the foam passes beneath the impinging air streams, a smooth, uniformly even surface is generated. As shown in Figure 2, the foam layer is uniformly thin and of substantially even thickness. Figure 3 illustrates the foam in the process of rising, after which a top outer skin (not shown) may be suitably secured upon contact with the foam to form a panel having a foamed core or inner portion. The speed (f.p.m.) of the platform carrying the framelike supporting structure beneath the dispensing heads and the rate of the output of said heads are adjusted so that the total volume of foam dispensed will equal the product of the surface area of the foam and the thickness required. These factors may be closely controlled by various instruments (not shown) which would monitor them continually or periodically.

If desired, the gas nozzles may also be used to produce uneven laydown patterns of the foam. This may be achieved by changing some of the parameters such as nozzle height, nozzle pressure, density of gas, and spray patterns. The gas nozzles should be disposed in line with the mixing heads and dispensing orifices and the gas streams should preferably be directed substantially perpendicular to the horizontal plane in which the supporting structure lies. It is rather important that the gas streams are impinged substantially at right angles to the surface plane of the foam since the front end or rear end of the framelike structure would not otherwise be uniformly filled in had the streams been directed at an angle with the vertical. Moreover, in this regard, better control over the thickness of the foam is maintained.

Any suitable means may be used to motivate the platform supporting the mold pattern. Of course, the gas used in the practice of the invention should not react with the foam. Suitable gases compatible with most foams are fluorocarbons, air and the like.

The main advantages of the process of the invention are its simplicity and lack of complicated mechanical equipment.

What is claimed is:

1. A method of spreading and distributing liquid-state foam comprising depositing said liquid-state foam onto a suitable base having a mold containing sidewalls and a bottom from a plurality of adjacently spaced dispensing orifices in a manner such that as impinging multiple streams of gas are directed substantially perpendicular to said foam an integral, uniform and even laydown is immediately established in said mold from sidewall to sidewall prior to the commencement of the foaming action whereby the front and rear portions of said mold are uniformly filled to the same depth as the remaining portions of said mold.

2. The method of claim 1 wherein said gas is air.

3. A method of spreading and distirbuting liquid urethane foam comprising depositing said liquid urethane foam on a suitable base having a mold containing sidewalls and a bottom from a plurality of dispensing orifices and impinging multiple fan shaped high velocity streams of air substantially perpendicular to said foam whereby said foam is immediately spread out and equally distributed as an integral, uniform laydown on said base bottom of said mold between said sidewalls and whereby the front and rear portions of said mold are uniformly filled to the same depth as the remaining portions of said mold.

References Cited by the Examiner

UNITED STATES PATENTS

| 1,604,941 | 10/26 | Hofmann | 118—63 XR |
| 2,004,465 | 6/35 | Dietrichs | 264—93 |
| 2,130,241 | 9/38 | MacLawin | 118—63 XR |
| 2,252,345 | 8/41 | Johnson | 118—63 XR |
| 2,770,556 | 11/56 | Grangaard et al. | 118—63 XR |
| 2,825,094 | 3/58 | Zeigler | 264—299 XR |
| 2,827,665 | 3/58 | Rogers et al. | 264—54 |
| 3,081,487 | 3/63 | Heffner et al. | 264—54 XR |
| 3,098,756 | 7/63 | Haracz | 118—63 XR |

FOREIGN PATENTS

| 72,998 | 8/53 | Netherlands. |

ALEXANDER H. BRODMERKEL, *Primary Examiner.*